(12) United States Patent
Böttcher (10) Patent No.: US 7,722,020 B2
(45) Date of Patent: May 25, 2010

(54) ARRANGEMENT AND A METHOD FOR CLAMPING THIN RODS

(75) Inventor: Uwe Böttcher, Stockholm (SE)

(73) Assignee: Nyfors Teknologi AB, Stockholm (SE)

( * ) Notice: Subject to any disclaimer, the term of this patent is extended or adjusted under 35 U.S.C. 154(b) by 964 days.

(21) Appl. No.: 10/519,528

(22) PCT Filed: Jun. 10, 2003

(86) PCT No.: PCT/SE03/00950

§ 371 (c)(1),
(2), (4) Date: Dec. 27, 2004

(87) PCT Pub. No.: WO04/001467

PCT Pub. Date: Dec. 31, 2003

(65) Prior Publication Data

US 2005/0220428 A1 Oct. 6, 2005

(30) Foreign Application Priority Data

Jun. 25, 2002 (SE) .................................. 0201946

(51) Int. Cl.
*B25B 11/00* (2006.01)
*B26D 7/01* (2006.01)

(52) U.S. Cl. ............................. 269/71; 269/43; 269/45; 29/281.1; 83/375; 225/93

(58) Field of Classification Search ..................... 83/13, 83/879, 956, 374, 375, 379, 382, 385, 391, 83/392; 225/2, 93, 94, 96, 96.5, 105; 269/43, 269/45, 71; 29/281.1
See application file for complete search history.

(56) References Cited

U.S. PATENT DOCUMENTS

| 4,039,309 | A | * | 8/1977 | Albanese et al. | ............... 65/433 |
| 4,202,475 | A | * | 5/1980 | Hirai et al. | ..................... 225/2 |
| 4,473,942 | A | * | 10/1984 | Ridgway | ..................... 29/869 |
| 5,312,468 | A | | 5/1994 | Yin et al. | |
| 5,395,101 | A | * | 3/1995 | Takimoto et al. | ........ 269/289 R |
| 5,842,622 | A | * | 12/1998 | Mansfield et al. | .......... 225/96.5 |
| 6,634,079 | B1 | * | 10/2003 | Kazama | ..................... 29/564.4 |
| 6,668,128 | B2 | * | 12/2003 | Hattori et al. | ............... 385/136 |
| 6,754,426 | B2 | * | 6/2004 | Lee et al. | ..................... 385/136 |

FOREIGN PATENT DOCUMENTS

GB 2118539 11/1983

* cited by examiner

Primary Examiner—Kenneth E. Peterson
Assistant Examiner—Phong Nguyen
(74) Attorney, Agent, or Firm—Dilworth & Barrese LLP (57) ABSTRACT

An arrangement for clamping a thin rod of glass or quartz having a diameter below 1 mm in two mutually-spaced clamping locations for holding the rod extended between the two clamping locations. The arrangement also comprises first clamping device arranged to clamp the rod in a first clamping location. The first clamping device has a first clamping member (22) with a clamp face (23) of substantially V-groove type for receiving the rod in the groove (24). The first clamping member is movably arranged with respect to a framework (45) of the apparatus for clamping a rod.

3 Claims, 6 Drawing Sheets

ARRANGEMENT AND A METHOD FOR CLAMPING THIN RODS

TECHNICAL FIELD OF THE INVENTION AND PRIOR ART

The present invention relates to an arrangement for clamping thin rods of glass or quartz (silica) having a diameter below 1 mm as well as a method for carrying out such a clamping according to the preambles of the appended independent arrangement and method claims.

Such an arrangement may be used to clamp and hold most varying types of rods for many different purposes, for instance an optical fibre for stripping or washing the fibre or for cleaving thereof. Although the invention is in general directed to clamping such thin rods of glass or quartz for any purpose, the invention and the problem to be solved thereby will hereinafter by way of a non-limitative example be discussed for the case of clamping optical fibres to be cleaved.

Optical fibre ends are commonly prepared for a variety of purposes (jointing, characterization etc) by a process known as cleaving. In such a process, a blade prepared from a hard material, such as a diamond, is brought into a lateral engagement with the fibre to be cleaved in such a manner as to initiate a fracture which subsequently propagates through the fibre cross-section until the fibre parts. The resulting cleaved fibre end surface should, as far as possible, be optically flat and perpendicular to the fibre longitudinal axis. Undue intrusion of the blade into the fibre during the cleaving process can damage the fibre so as to detract from the quality of the resulting end surfaces.

An arrangement according to the preambles of claims 1 and 2 is already known through U.S. Pat. No. 4,790,465 disclosing an apparatus for cleaving optical fibres. Although the apparatus of U.S. Pat. No. 4,790,465 may be used for obtaining comparatively high quality cleaved fibre end surfaces there is of course always a desire to improve such an apparatus with respect to both the cleaving result and the construction and by thereby the costs for manufacture and operation thereof. The present inventors have realized that it should be possible to obtain such an improvement by modifying said first clamping means of said arrangement. The clamping member with a clamp face of substantially V-groove type has to be occasionally exchanged, for example for adapting this clamping means to clamp a fibre with another diameter than the fibre cleaved in said apparatus before or for exchanging a clamping member having the V-groove worn out or damaged. This exchange takes in the apparatus according to U.S. Pat. No. 4,790,465 a considerably long period of time resulting in substantially costs as a consequence of a reduced efficiency of the apparatus. The reason for this is that a considerably amount of work is required for removing said first clamping member from the apparatus.

Another disadvantage of the arrangement of the apparatus according to U.S. Pat. No. 4,790,465 is that one of the two members of the first clamping means, namely the one having said flat opposing clamp face, is pivoted with respect to the other clamping member of said first clamping means for clamping an optical fibre located in the groove, and this means that there is an inherent risk of applying torsional stress to the fibre through said clamping action. Although it is stated in said US patent that the fibre is not rotated when the clamping means closes, the risk of influencing the fibre in the direction of such a rotation shall not be neglected due to the presence of said pivoting movement. Torsional stress applied to a fibre during cleaving can cause the cleave to propagate across the fibre at an angle of up to 45° with respect to the fibre axes, rather than 90° as desired.

SUMMARY OF THE INVENTION

An object of the present mention is to provide an arrangement of the type defined herein having a higher efficiency discussed above than such arrangements already known.

This object is according to the invention obtained by providing such an arrangement having the characteristics that the first clamping member is movably arranged with respect to a framework of the arrangement, and that the arrangement further comprises driving means for moving the first clamping member having the grooved clamp face towards and away from the second clamping member for clamping and releasing a said rod, respectively.

By arranging said substantially V-groove in a movable clamping member of said first clamping means and not in one being fixed to a framework of the apparatus, it will be easy to remove the first clamping member for exchanging it by another first clamping member having a groove being differently designed or for replacing a first clamping member being worn out or damaged by a new one. Thus, the efficiency of the arrangement may be raised.

Another object of the present invention is to provide an arrangement of the type defined herein reducing the risks of applying torsional stress to a rod clamped by said first clamping means with respect to the arrangement according to the US patent mentioned above.

This object is according to the invention obtained by providing such an arrangement having the characteristic that it further comprises driving means adapted to move at least one of said clamping members for creating a rectilinear relative movement of said clamping members towards and away from each other for clamping and releasing a said rod, respectively.

By arranging the members so that they will carry out a rectilinear relative movement for clamping a rod the risks of applying torsional stress to a rod being clamped will be reduced remarkably with respect to the case of arranging one of the members pivoted with respect to the other.

According to a preferred embodiment of the invention said clamping member being movable for clamping and releasing a said rod is received in a guide of the apparatus and removable from the apparatus by pushing and/or lifting it out of the guide for exchange. This means a remarkable improvement with respect to the apparatus of the US patent discussed above concerning the time consumption of exchange of the clamping member being provided with the groove, in the case that the first clamping member is movable, and it also means a possibility to obtain said rectilinear relative movement in a favourable way in the case that the clamping members are moved in a rectilinear relative movement for clamping a rod.

According to another preferred embodiment of the invention the guide is constituted by a slot having a bottom on which said clamping member is intended to rest and lateral walls intended to guide the clamping member in said movement, and the clamping member is removable from the apparatus by lifting it out of the guide. This means that this clamping member may very rapidly be removed and replaced by a new one. It is then especially preferred if the movable clamping member comprises a block-like piece resting only through gravity in said guide, and this block-like piece has preferably a considerable weight with respect to other parts of the arrangement for reliably resting in said guide.

According to another preferred embodiment of the invention the arrangement further comprises at least one member having at least one inclined surface and means for moving said member laterally towards a rod being clamped in only a second of said two clamping locations for clamping it in the first clamping location through said first clamping means with the inclined surface into abutment against the rod for influencing the rod by sliding thereof upon said surface for reaching the position desired for said first clamping location before clamping the rod in that location. The existence of such a member moving the rod into the desired position before the rod is clamped in said first clamping location means that the clamping action may be carried out while reducing the risk of the rod being not correctly located when clamped and by this being twisted by said clamping action, which for example would degrade the quality of a future cleaved end surface as discussed above.

The arrangement also comprises an apparatus for cleaving thin rods of glass or quartz according to the appended independent apparatus claim. According to a preferred embodiment said arrangement of such an apparatus comprises a second clamping means arranged to clamp said rod in a second said clamping location, the second clamping means is movable in the longitudinal direction of a said rod extended between the two clamping locations, the apparatus comprises means for moving the second clamping means in said longitudinal direction for extending a rod clamped by said arrangement for applying a longitudinal tension load to the rod, and the second clamping means is adapted to clamp said rod in a second said clamping location belonging to the part of a cleaved rod intended for later use. This means that there is a possibility to use the power applying the tension load to move the cleaved end surface away from the cleaving point immediately when the rod parts, so that there will be no risk of damaging this end surface by further contact with the blade after the cleaving instant. This is also the subject of another preferred embodiment of the invention. Such an embodiment is particularly advantageous in the case of having an apparatus with a body carrying the blade and driving means adapted to act upon said body for causing a relatively steady movement of the blade towards said desired cleaving point while subjecting the blade to a relatively small-amplitude vibratory component of movement towards and away from said cleaving point superimposed to said relatively steady movement towards the cleaving point, since this then means that there will be no risk that the vibrating blade will hit the rod once again after the rod has been cleaved.

The invention also relates to methods of clamping a thin rod. The advantages of such methods and the embodiments thereof appear without any doubt from the above discussion of the preferred embodiments of the arrangement according to the present invention.

The invention also relates to a computer program and a computer readable medium. It is easily understood that the methods according to the invention defined herein are well suited to be carried out through instructions from a processor that may be influenced by a computer program provided with the program steps in question.

Further advantages as well as advantageous features of the invention appear from the following description and the other dependent claims.

BRIEF DESCRIPTION OF THE DRAWINGS

With reference to the appended drawings, below follows a specific description of a preferred embodiment of the invention cited as an example.

In the drawings.

DETAILED DESCRIPTION OF A PREFERRED EMBODIMENT OF THE INVENTION

Figure 1:
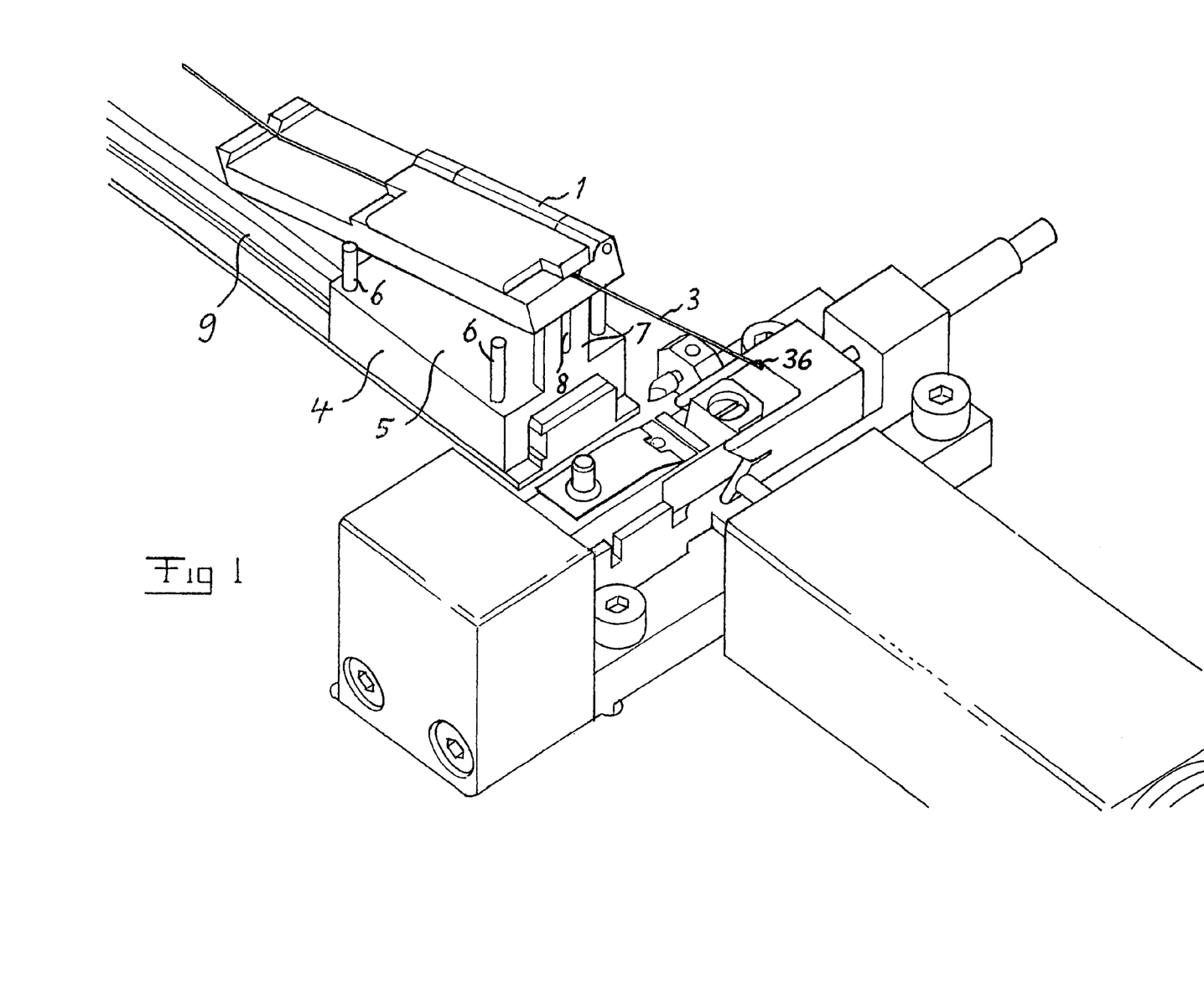
FIG. 1 is a perspective view of an apparatus according to a preferred embodiment of the invention in an initial state of a cleaving sequence of loading the apparatus with a thin rod, such as an optical fibre, to be cleaved.
Figure 2:
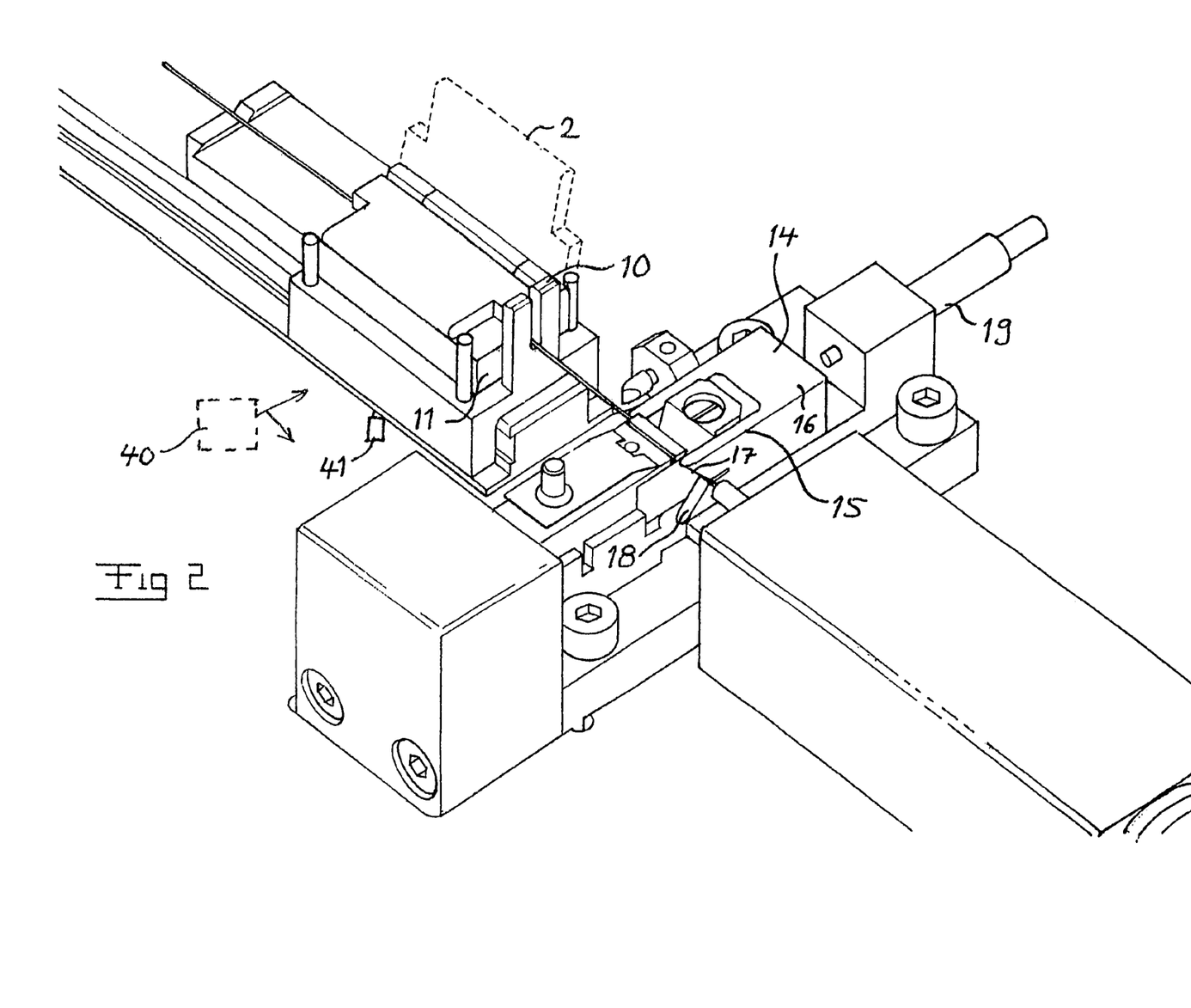
FIG. 2 is a view corresponding to FIG. 1 of the apparatus in a state of said cleaving sequence in which the thin rod has been clamped in two mutually-spaced clamping locations.

FIG. 1 illustrates an apparatus for cleaving thin rods of glass or quartz, preferably optical fibres, having a diameter below 1 mm, and preferably in the range of 50 µm-200 µm. The optical fibre is clamped in a second clamping means 1 in the form of a conventional fibre holder used for holding a fibre also when joining two optical fibres, and this is already known. It is schematically illustrated in FIG. 2 by dashed lines how a lid 2 of said clamping means may be pivoted for opening and closing this clamping means. This clamping means 1 is adapted to hold the fibre to be cleaved with a part 3 on which the cleaving is to be carried out projecting out from the fibre holder.

The apparatus also comprises a member 4 adapted to receive the fibre holder 1 therein for holding it in a well-defined position during the cleaving sequence. The receiving member 4 has the character of a carriage with a bottom 5 onto which the fibre holder is intended to rest and guiding members 6 in the form of pins for laterally supporting the fibre holder in a well defined position on the carriage 4. The carriage has also a front member 7 extending upwardly from the bottom 5 and defining the position of the fibre holder in the longitudinal direction of a fibre held therein. This front member 7 has a central slot 8 extending therethrough and opening upwardly for receiving the free fibre part 3 therein. The carriage 4 is moveable in the longitudinal direction of a fibre in a fibre holder received therein and in the longitudinal direction of a rail 9 in a way to be described further below.

This construction of said receiving member 4 is very favourable with respect to the loading of a fibre to be cleaved in the apparatus. This loading action takes place in the following way. The fibre holder 1 with a fibre clamped therein and a part 3 to be cleaved projecting out therefrom is placed in the position shown in FIG. 1 with the front portions of the fibre holder 1 resting upon the upper surfaces 10 of the front member 7. The guiding pins 6 will define the correct direction of the fibre holder. The fibre holder 1 is then retracted, so that it will leave the support on the front member 7 and be lowered onto the bottom 5 of the receiving member 4 while being guided in a well defined movement through the guiding pins 6, and the part 3 of the fibre will move down in the slot 8 to the position shown in FIG. 2. This well controlled movement of the fibre part 3 means that there is no risk of damaging the fibre through contact with other members of the apparatus during this loading action.

Furthermore, the front member 7 and the bottom 5 of the carriage 4 are adapted to magnetically interact with the fibre holder 1 having for this sake magnets for keeping the fibre holder in a well defined position with the front end 11 thereof into contact with the front member 7.

Figures 6, 7:
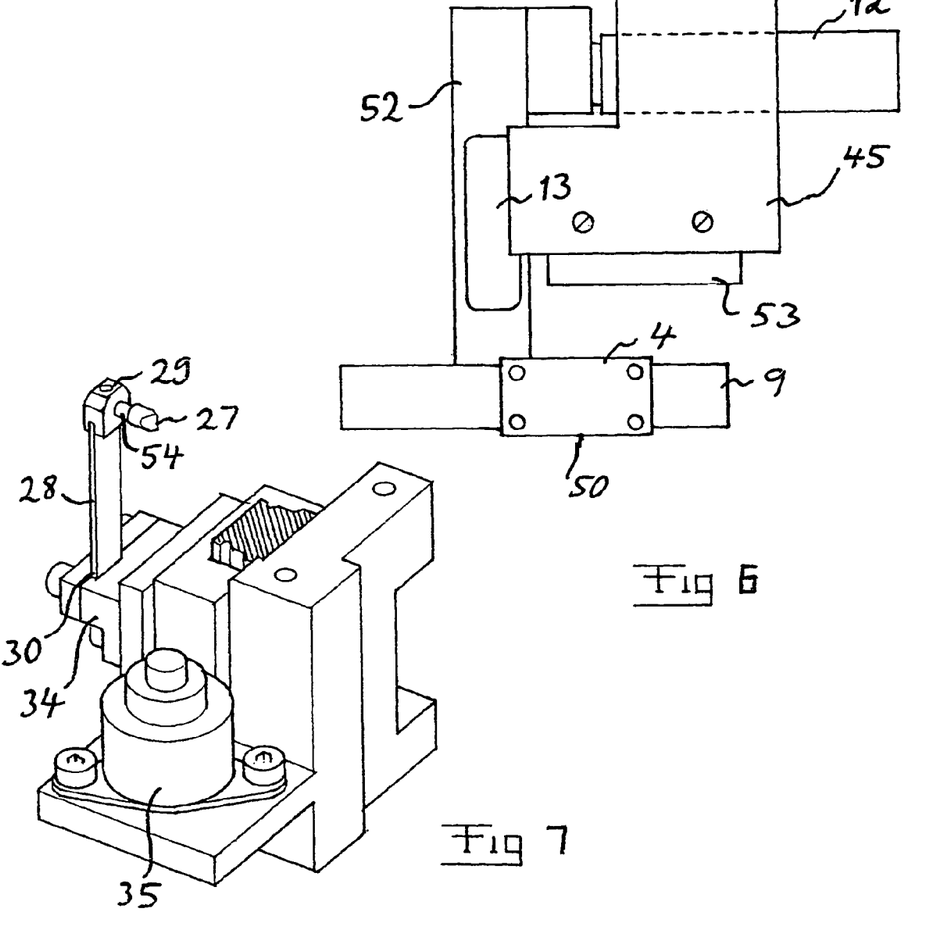
FIG. 6 is a simplified view illustrating how the means for clamping said rod in the other clamping location may be moved for moving said clamping location in the longitudinal direction of the rod.
FIG. 7 is a simplified perspective view illustrating the body carrying the rod cleaving blade and the driving means used to perform the cleaving operation.
Figure 8:
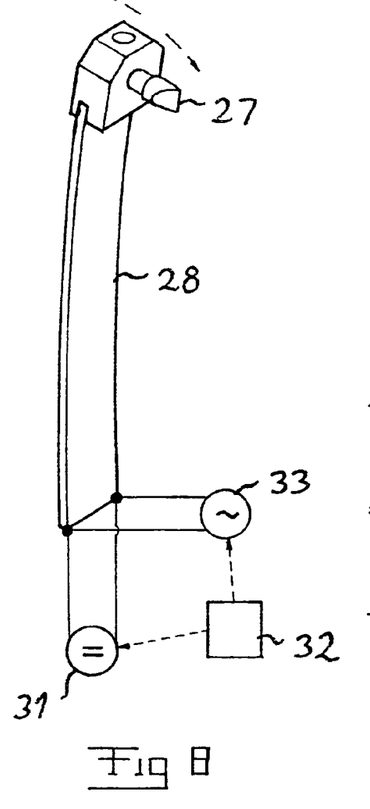
FIG. 8 is a simplified perspective view of said rod cleaving blade and the body carrying the blade illustrating the principal of achieving the cleaving movements of the blade.
Figure 9:
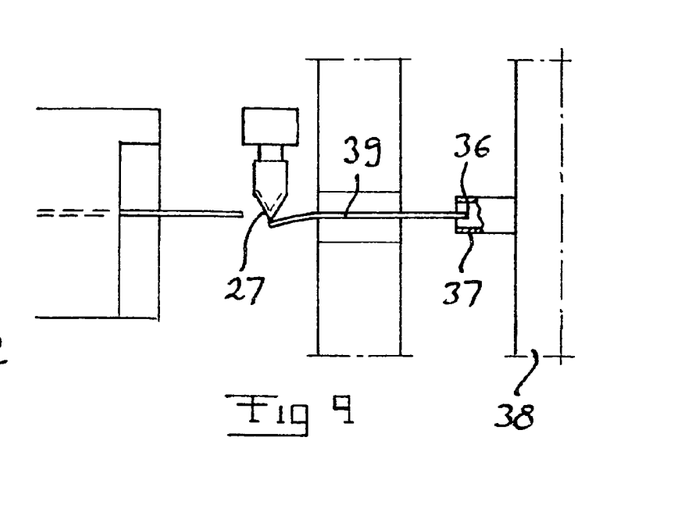
FIG. 9 is a simplified view from above of a part of the apparatus according to FIG. 1 in a state of the cleaving sequence in which the vary cleaving has already been carried out.
Figure 10:
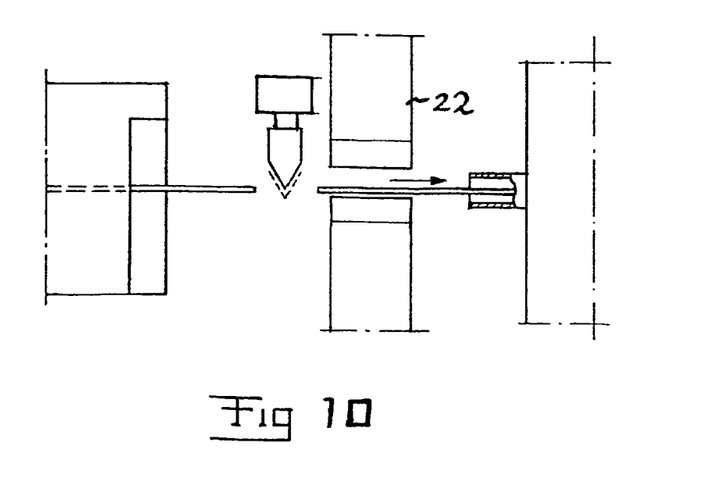
FIG. 10 is a view corresponding to FIG. 9 of the step of said cleaving sequence following directly upon the state illustrated in FIG. 9.

It is illustrated in FIG. 6 how the carriage is fixed to the rail 9 with a screw 50. This is done for obtaining the correct cleaving length. Means 12 for moving the rail 9 and by that the carriage 4 in the form of a dc-motor is arranged to act between a fixed frame 45 of the apparatus and an arm 52 rigidly connected to the rail 9 for moving these parts in a linear bearing 53. The connection between the motor 12 and the carriage 4 includes means 13 in the form of a load cell for measuring the load applied through the motor onto the carriage. This means when the clamping part 3 is clamped in another clamping location downstream of the fibre holder 1 that the tension in said fibre may be influenced by the motor 12 and the magnitude of that tension load may be measured by the load cell 13. The apparatus also comprises means 41 for very accurately measuring the position of the carriage 4 and communicating with a computer 40 (see below).

Figure 3:
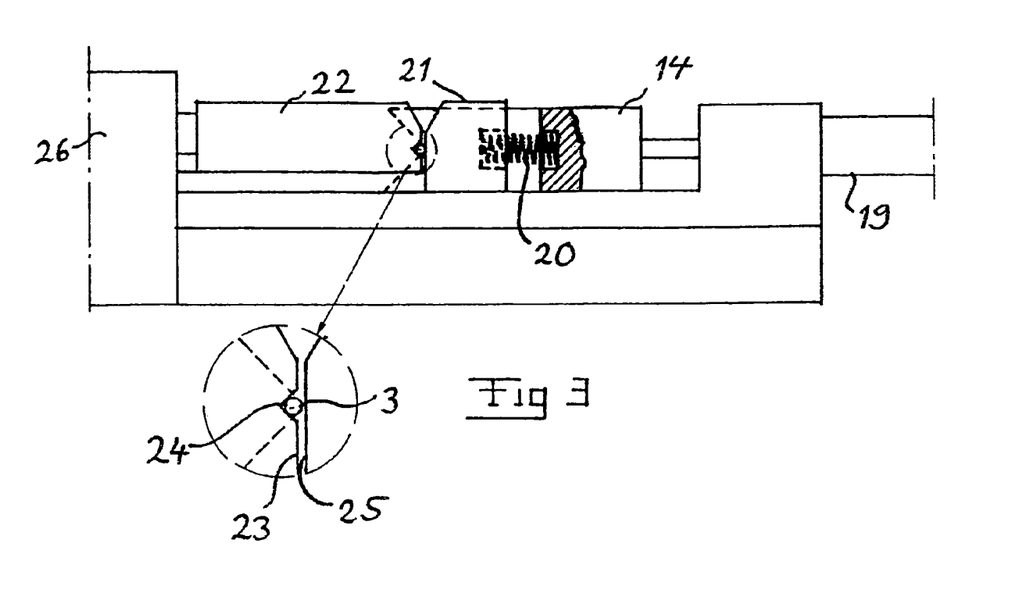
FIG. 3 is a simplified side-elevation of a part of a clamping arrangement of the apparatus according to FIG. 1 illustrating the means for clamping the rod in one of said clamping locations and adjusting the height of the rod to be clamped there more in detail.

The apparatus also comprises a member 14 adapted to adjust the position of the fibre part 3 in the first clamping location thereof before the fibre is clamped in that location. This member 14 comprises for that sake two members 15 extending substantially in parallel with each other from a frame 16 and having each two inclined surfaces 17, 18, which are oppositely inclined with respect to a horizontal plane through the two clamping locations desired. Driving means 19, here driven by compressed air, is arranged to move the member 14 so that the fibre part 3 comes into abutment against one of the inclined surfaces of each member 15 for sliding thereupon and reaching the position desired for a clamping location of the fibre part 3 corresponding to a position of the fibre part in a seat of the members 15 in the intersection between the two inclined surfaces 17, 18 of each member 15. This means that the fibre part 3 is then in a well-defined position before it is clamped, so that it may be subsequently clamped without being damaged or exerted to torsion loads or the like.

It is further illustrated in FIG. 3 how a spring member 20 is counter-acting the driving means 19 while being arranged to act between a member 21 being fixed with respect to a frame work 45 of the apparatus and the frame 16 of the member 14, so that the member 14 will automatically be withdrawn from the fibre part when the influence of the driving means 19 thereupon is removed.

Figure 4:
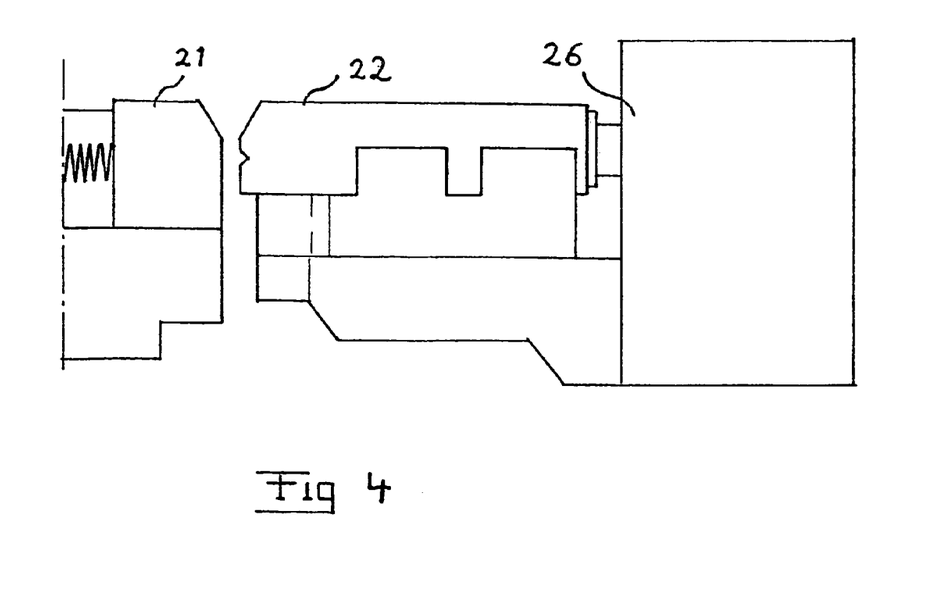
FIG. 4 is a simplified side-elevation mainly illustrating a first clamping means of the apparatus according to FIG. 1.
Figure 5:
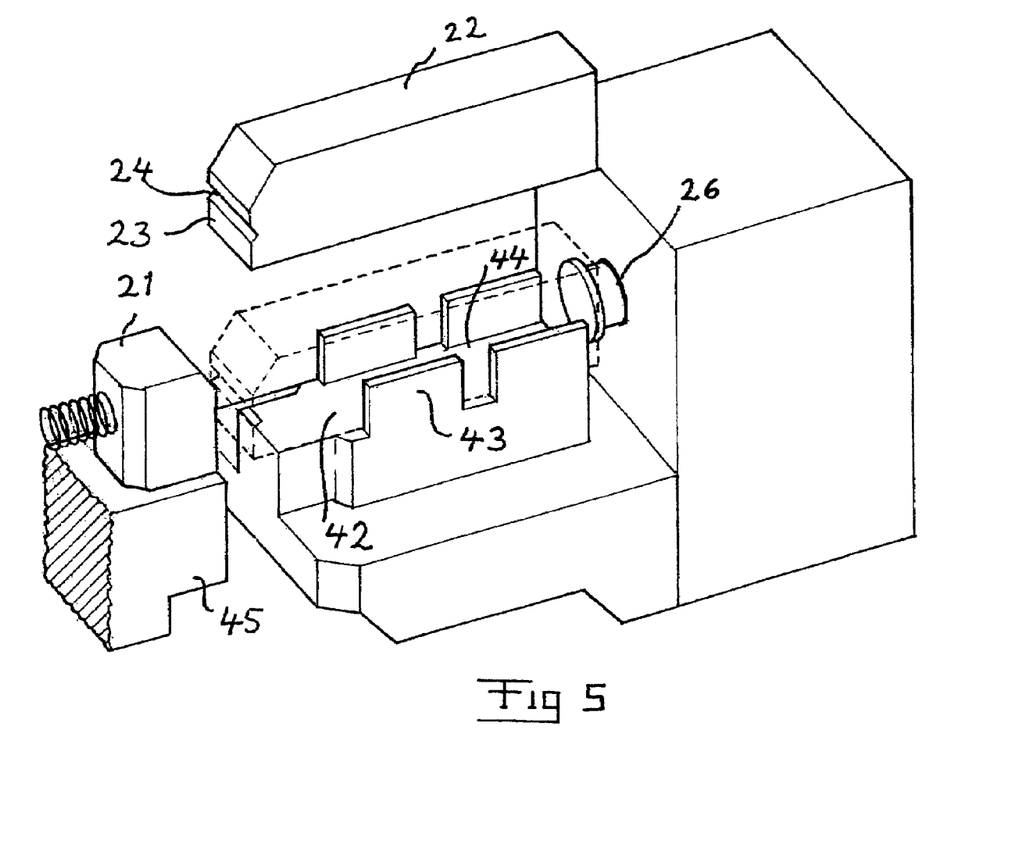
FIG. 5 is a perspective view of the first clamping means illustrated in FIG. 4 showing how easily a first clamping member thereof may be exchanged.

The apparatus also comprises a first clamping means adapted to clamp the fibre in one of said two mutually-spaced clamping locations, and this first clamping means comprises a first clamping member 22 with a clamp face 23 of substantially V-groove type, for receiving a fibre part 3 in a groove 24, and a second clamping member formed by said fixed member 21 having a flat opposing clamp face 25 for retaining the fibre in the groove. The apparatus comprises a driving means 26 driven by compressed air for moving said first clamping member 22 in the direction towards the second clamping member 21 for clamping a fibre. The first clamping member 22 is constituted by a block-like piece resting only by means of the gravitation on a surface in a guide 44 having a bottom 42 and lateral walls 43 intended to guide the clamping member 22 in its rectilinear movement towards and away from the second clamping member 22, so that it may easily be removed from the apparatus by lifting it out of the guide for exchange when the groove or the face portions adjacent thereto have been worn out or for replacing it by a first clamping member being designed for clamping rods with a different diameter. Thanks to this arrangement of a preferably comparatively heavy block-like piece 22 movable in said guide a movement being perfectly rectilinear without the slightest component deviating therefrom may be achieved. It is in FIG. 5 shown how easily the piece 22 may be removed and put in place. Magnets may nevertheless be used to assist to keep the piece 22 even better in place when arranged in the guide 44.

The apparatus also comprises a rod cleaving blade 27 (see especially FIGS. 5 and 6) adapted to be brought into lateral contact with the fibre at the desired cleaving point between said two clamping locations, to achieve cleaving of the fibre at said point. This blade 27 is made of a hard material, such as diamond. The cleaving blade is carried by a body 28 comprising a strip-like stave having the blade 27 arranged on a free end 29 thereof and being fixed at the other end 30. This stave is made of a material varying its length through application of an electric field therein, i.e. a piezo-electric material.

The apparatus further comprising driving means adapted to act upon the stave for causing a relatively steady movement of the blade towards a desired cleaving point while subjecting the blade to a relatively small-amplitude vibratory component of movement towards and away from said cleaving point superimposed to said relatively steady movement towards the cleaving point. The arrangement of the blade on a free end of a stave means that said movements of the blade, both the relatively steady movement and the relatively small-amplitude vibratory component of movement, take place along an arc-like path and the blade will hit the fibre in a direction making an angle with the fibre differing from 90° for cutting the fibre in this direction. Accordingly, this path of these movements means that the blade will "scratch" the fibre when hitting it resulting in a cleaner score and fibre end surface than when just impacting the fibre perpendicularly thereto as in said U.S. Pat. No. 4,790,465. This scratching action is further improved by arranging the blade on the free end of a projection 54 projecting from the stave towards the fibre at a distance from the stave. The movements are achieved in the way illustrated in FIG. 6 by applying a direct voltage through a direct voltage source 31 across the stave 28, the magnitude of which is controlled by a control means 32 for bending the free end of the stave 28 towards a fibre clamped in the apparatus. The driving means also comprises an alternating voltage source 33 adapted to apply an alternating voltage across the stave 28 for generating said vibratory component of movement of the blade. Also the alternating voltage source is controlled by the control means 32. The alternating voltage applied to the stave has a frequency below 1 kHz and preferably below 750 Hz. In a particular embodiment the frequency is about 350 Hz. The peak to peak voltage of the alternating voltage may typically be in the order of 50 V, whereas the direct voltage may typically be varied from 0 to 100 V.

The stave 28 is fixed to a frame 34 moveable with respect to the frame work of the apparatus through a step motor 35 in the vertical direction in steps of for example 50 µm for controlling the position along the blade of the blade portion used for cleaving a fibre, so that this position may be changed for changing said blade portion when a previous blade portion has been worn out, for example after carrying out about 1 000 cleaving operations while using the same blade portion therefor. This is preferably controlled by a computer program.

The rest of the constructional features of the apparatus according to the invention will now be explained while explaining the entire cleaving sequence of the apparatus.

The fibre holder 1 is firstly arranged in the carriage 4 in the way indicated in FIG. 1 and in the position shown in FIG. 2. A button is then pressed and the rest of the operation of the apparatus will take place automatically and preferably controlled by a computer 40 indicated in FIG. 2. The dc-motor 12 will firstly move the carriage 4 so that the free end 36 of the fibre comes inside a small tube 37 belonging to a device 38 adapted to draw a waist fibre portion 39 away through application of negative air pressure after the cleaving has been performed. After that the driving means 19 moves the members 15 towards the fibre for entering contact therewith through the inclined surfaces 17, 18 for adjusting the height of the fibre.

The driving means 26 is then pushing the first clamping member 22 of the first clamping means towards the fixed clamping member 21 for clamping the fibre in a first clamping location mutually-spaced from the second clamping location defined by the fibre holder 1. The action of the driving means 19 upon the member 14 is then removed, so that this member 14 is retracted through the action of the spring member 20. Said computer indicated through the dashed box 40 is then sending a signal to the means 12 for influencing the carriage 4 in the longitudinal direction of the fibre away from the second clamping location for applying a tension load to the fibre. The magnitude of this tension load is measured through the load cell 13 sending information thereabout to the computer 40. The tension load is in this way set to a value by the computer, for instance 1.5 N, but this value will change with the diameter of the fibre or the rod to be cleaved.

The driving means 35 is then controlled to move the blade 27 vertically to the desired position for the cleaving procedure. The control unit 32 does then control the direct voltage source 31 to gradually increase the direct voltage applied to the stave 28 for bending the stave, so that the blade 27 carries out a relatively steady movement towards the fibre. The control unit 32 controls at the same time the alternating voltage source 33 to apply an alternating voltage to the stave 28 for causing the blade 27 to vibrate towards and away from the fibre with a small amplitude in the order of 5-40 μm, preferably in the range of 30 μm. The blade 27 will in this way move with a velocity in the order of 1 mm/s towards the fibre while oscillating for cleaving the fibre. The low frequency of the vibration means that the blade 27 will move comparatively far in the direction towards the fibre in the period of time between two subsequent oscillations at a given, suitable velocity of said relatively steady movement. When for example this velocity is 1 mm/s and said frequency is 400 Hz this means an advancing distance of 2.5 μm between subsequent "strikes" of the blade, which is much more than for the blade in the US patent discussed in the introduction. This is a great advantage, since it means that the probability that the fibre parts already after being hit once by the blade is high and the fibre end surface resulting from the cleaving would be degraded by additional hits by the blade. The load cell 13 will indicate that the fibre has been cleaved through the disappearing of the tension load in the fibre. This information from the load cell will cause the control means 32 to stop the oscillation of the blade and remove the bending action thereupon. Furthermore the spring force in the load cell will automatically move the cleaved fibre end away from the blade immediately when the fibre parts.

The motor 12 is then controlled to move the carriage 4 slightly, in the order of 1 mm, away from the cleaving point for removing the cleaved end surface from the cleaving point as shown in FIG. 7. This movement will in fact be carried out automatically upon the cleaving of the fibre thanks to the favourable provision that the means 12 applying the longitudinal tension load to the fibre 3 is acting upon the carriage 4 and thereby the fibre holder 1 in the second clamping location belonging to the part of a cleaved rod intended for later use. This means that the valuable part of the fibre having the end surface aimed at by the cleaving action is efficiently immediately upon cleaving moved away from the cleaving point without any risk of being hit by the blade again after the cleaving moment. The driving means 19 is then controlled to move the member 14 to the position shown in FIG. 7 in contact with the waist fibre portion 39 resulting from the cleaving. The control means 32 influences then the direct voltage source 31 to move the blade 27 towards the waist fibre portion to laterally apply a force thereonto as shown in FIG. 7. The driving means 26 is then controlled to move the first clamping member 22 of the first clamping means away from the second clamping member 21 for releasing the waist fibre portion, and the tension caused therein by the blade will assist the waist fibre portion to leave the groove 24 and be drawn away through the tube 37 by the device 38 for being disposed of.

The member 14 is retracted by shutting-off the pressurized air from the means 19, so that the spring 20 pushes the member 14 back. After that the control means 32 controls a withdrawal of the blade and the motor 35 returns the blade to the start position. The fibre holder 1 may now be removed for using the fibre end surface obtained through the cleaving process for joining or other purposes. The carriage 4 is moved to the "home" position by means of the dc-motor 12. The apparatus is now ready for cleaving a new fibre.

Studying the fibre end surfaces obtained by carrying out said cleaving process in the apparatus according to the present invention in interference microscope has shown that these end surfaces are of a very high quality, i.e. they are all within ±0.17° from being exactly perpendicular to the fibre longitudinal axis.

The invention is of course not in any way restricted to the preferred embodiment described above, but many possibilities to modifications thereof will be apparent to a person with ordinary skill in the art without departing from the basic idea of the invention as defined in the appended claims.

Although not necessary, it is well possible to use an anvil to support the fibre at the cleaving point.

The material of the body carrying the blade may just as well be of the type varying its length through application of magnetic fields, i.e. which has magneto-strictive properties, so that a relatively steady varying magnetic field and an alternating magnetic field may be used for generating the two superimposed movements of the blade according to the present invention.

"Relatively steady" as used for one of the movements of the blade is to be interpreted in relation to the vibratory component of movement, and does not restrict this movement to have a constant speed, but this may be changed during the movement, for example gradually decreasing or even gradually increasing. "Relatively small-amplitude" with respect to the vibratory component of movement is to be interpreted as indicating that the amplitude of this movement is small with respect to the distance the blade is moving through said relatively steady movement thereof.

It is possible to replace the members having two inclined surfaces by members having each only one inclined surface and being moved from two opposite directions towards said rod.

Although it is spoken about fibre "height" adjustment and other words defining the orientation of the apparatus are used, these are to be interpreted as not restricting the scope of the present invention, but it would for example be possible to arrange the apparatus with the fibre clamped therein extending vertically.

"Rectilinear relative movement" as used in the claims of course also covers the case of moving both said clamping members at the same time. It would also be possible to move only the second clamping member having the substantially flat clamp face. Accordingly, this clamping member may be the one received in the guide or both clamping members may be received in a guide of the type discussed above.

The arrangement may have two or all clamping means designed as said first clamping means as defined in this disclosure.

The member having at least one inclined surface for guiding the rod into said groove may just as well be arranged on the first clamping member laterally thereof for being moved together therewith, so that the same driving means may be used for these two members.

The invention claimed is:

1. An arrangement for clamping a thin rod (3) of glass or quartz having a diameter below 1 mm in two mutually-spaced clamping locations for holding said rod extended between the two clamping locations, said arrangement comprising first clamping means arranged to clamp said rod (3) in a first clamping location, said first clamping means having a first clamping member (22) with a clamp face (23) shaped as a substantially V-shaped groove for receiving the rod in the groove (24), and a second clamping member (21) having a substantially flat opposing clamp face for retaining the rod in the groove, wherein the arrangement further comprises a first driving means (26) for moving said first clamping member for creating a rectilinear relative movement of said clamping members (21,22) towards and away from each other for clamping and releasing said rod, respectively, and an additional member (14) besides said first (22) and second (21) clamping members, said additional member having at least one inclined surface and a second drive means for moving said additional member laterally towards said rod being clamped in the first clamping location through said first clamping means, wherein the at least one inclined surface (17, 18) is brought into abutment against the rod for influencing the rod by sliding thereof upon said at least one inclined surface so that the rod reaches a position desired for said first clamping location before clamping the rod by said first clamping means in said first clamping location, and wherein said additional member (14) comprises two members (15) extending from a frame (16) and being arranged on opposite sides of said first (21) and second (22) clamping members, and each of the two members has two oppositely-inclined surfaces (17, 18).

2. An arrangement according to claim 1, wherein the two oppositely-inclined surfaces (17, 18) are oppositely inclined with respect to a plane including said two clamping locations, and the two oppositely-inclined surfaces are moved by said second driving means (19) laterally towards said rod for moving the rod to a seat in an intersection between said two oppositely-inclined surfaces (17, 18) as seen in the direction from one clamping location to the other.

3. An arrangement according to claim 1, wherein said at least one inclined surface (17, 18) is designed for adjusting the height of said rod (3) at said first clamping location before the rod is clamped there.

\* \* \* \* \*